Feb. 20, 1923.

J. V. JEWELL.
POT PROTECTOR.
FILED APR. 2, 1921.

1,446,349.

WITNESSES
W. G. Jones
F. J. Foster

INVENTOR
J. V. JEWELL
BY
Munn & Co
ATTORNEYS

Patented Feb. 20, 1923.

1,446,349

UNITED STATES PATENT OFFICE.

JOHN V. JEWELL, OF WATERLOO, IOWA.

POT PROTECTOR.

Application filed April 2, 1921. Serial No. 457,876.

*To all whom it may concern:*

Be it known that I, JOHN V. JEWELL, a citizen of the United States, and a resident of Waterloo, in the county of Blackhawk and State of Iowa, have invented a new and Improved Pot Protector, of which the following is a full, clear, and exact description.

This invention relates to improvements in pot protectors, an object of the invention being to provide a protector for pots, which will effectively prevent the inflammable handles of coffee pots and the like from becoming scorched or overheated while the pots are on the fire.

A further object is to provide a protector which will support a coffee pot over a gas burner in such a way that there is no danger in blackening the sides of the pot and a protector which may be conveniently shifted from one burner to another while it is hot.

A still further object is to provide a device of the character stated, which will be strong and durable in use, simple and practical in construction, and comparatively inexpensive to manufacture.

With these and other objects in view, the invention consists in certain novel features of construction and combinations and arrangements of parts, as will be more fully hereinafter described and pointed out in the claims.

In the accompanying drawings:—

Figure 1:
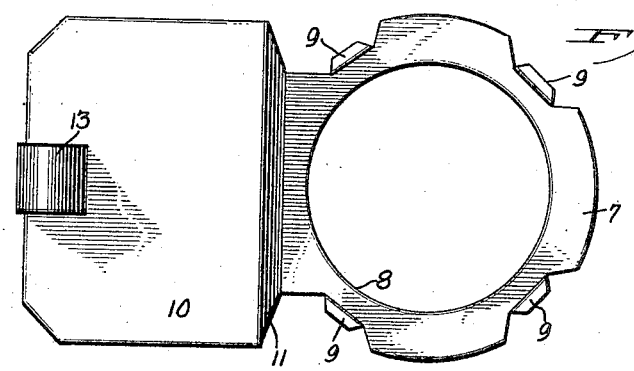
Figure 1 is a top plan view of my improved protector.
Figure 2:
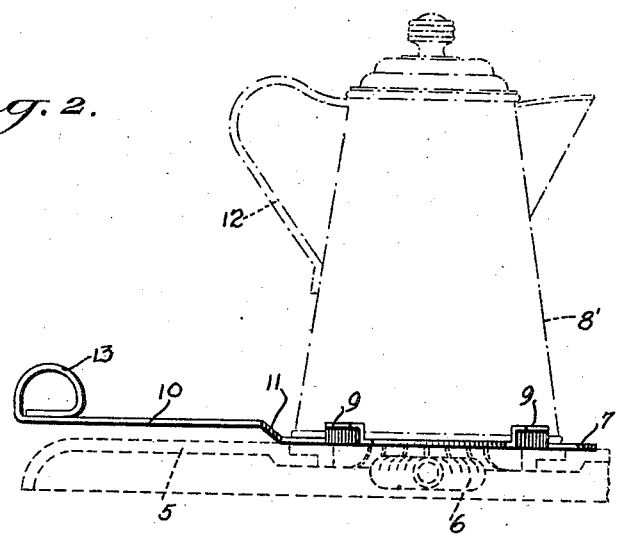
Figure 2 is a view in side elevation thereof, illustrating the protector in applied position.

Referring in detail to Figures 1 and 2 of the drawings, I have illustrated in dotted lines in Figure 2, the top plate 5 of a gas range, which is provided with the usual opening to expose a circular burner 6. The pot protector is formed from a single sheet of material and includes a flat annular pot supporting member such as 7, adapted to be located over the burner 6 and having a central circular opening 8 adapted to expose the bottom of a coffee pot, indicated in dotted lines at 8' to the flames of the burner. Integral upwardly presented lugs 9 are provided at intervals around the outer edge of the member 7 and serve to prevent the pot from sliding on this member.

A guard plate 10 is offset from the plane of the member 7 and is located in a parallel plane thereto, being connected to the member 7 by an integral connecting strip such as 11. This guard plate effectively screens the handle 12 of the coffee pot from the heat of the burner.

That edge of the guard plate which is furthest removed from the member 7 is formed with an integral extension bent back upon the plate to provide a handle member 13 in the form of a ring. This handle member facilitates the transferring of the protector from one burner to another without removing the pot from the protector, should such shifting become desirable. It also facilitates at all times the handling of the protector and obviates the necessity of the user soiling his hands.

It is to be understood that the protector may be made from any kind of sheet metal capable of being pressed into the desired shape.

Figure 3:
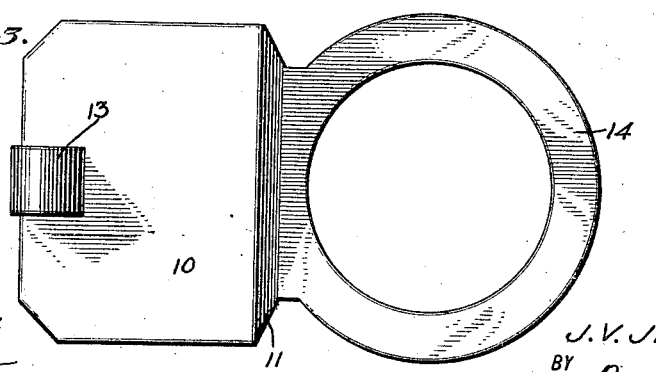
Figure 3 is a top plan view, illustrating a slight modification.

In Figure 3, I have illustrated a slightly modified form of the device, wherein a flat ring 14 is substituted for the lug carrying supporting member 7.

Various slight changes and alterations might be made in the general form and arrangement of the parts described without departing from the invention and hence I do not wish to limit myself to the precise details set forth, but shall consider myself at liberty to make such slight changes and alterations as fairly fall within the spirit and scope of the appended claims.

I claim:

1. As a new article of manufacture, a protector of the character described for use with vessels having handles, and including a flat supporting ring, a flame guard comprising a plate offset from the plane of the ring and integral therewith, and an extension on said flame guard bent to provide a ring shaped handle member.

2. As a new article of manufacture, a protector of the character described for use with vessels having handles, and including a flat supporting ring, a flame guard comprising a plate offset from the plane of the ring and integral therewith, and an extension on said flame guard bent in a plane perpendicular to the plane of said plate to provide a ring-shaped handle member located wholly above the plate.

JOHN V. JEWELL.